(12) United States Patent
Leglaye et al.

(10) Patent No.: US 10,190,430 B2
(45) Date of Patent: Jan. 29, 2019

(54) TURBINE ENGINE, SUCH AS A TURBOJET OR A TURBOPROP ENGINE

(71) Applicant: SAFRAN AIRCRAFT ENGINES, Paris (FR)

(72) Inventors: Francois Leglaye, Vaux le Penil (FR); Emeric D'Herbigny, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 135 days.

(21) Appl. No.: 14/385,867

(22) PCT Filed: Apr. 9, 2013

(86) PCT No.: PCT/FR2013/050768
§ 371 (c)(1),
(2) Date: Sep. 17, 2014

(87) PCT Pub. No.: WO2013/153322
PCT Pub. Date: Oct. 17, 2013

(65) Prior Publication Data
US 2015/0047356 A1    Feb. 19, 2015

(30) Foreign Application Priority Data

Apr. 11, 2012   (FR) ..................... 12 53338

(51) Int. Cl.
*F01D 11/00*    (2006.01)
*F01D 9/02*    (2006.01)
*F23R 3/00*    (2006.01)

(52) U.S. Cl.
CPC ............ *F01D 11/005* (2013.01); *F01D 9/023* (2013.01); *F23R 3/002* (2013.01);
(Continued)

(58) Field of Classification Search
CPC ........ F01D 11/00; F01D 11/005; F01D 9/023; F01D 5/26; F01D 25/04; F23R 3/00;
(Continued)

(56) References Cited

U.S. PATENT DOCUMENTS 4,126,405 A * 11/1978 Bobo .................. F01D 9/042
 415/115
5,118,120 A * 6/1992 Drerup .................. F16J 15/021
 277/628

(Continued)

FOREIGN PATENT DOCUMENTS

EP    0 615 055    9/1994
EP    1 391 582    2/2004
(Continued)

OTHER PUBLICATIONS

International Search Report dated Jul. 25, 2013, in PCT/FR13/050768, filed Apr. 9, 2013.

*Primary Examiner* — Ehud Gartenberg
*Assistant Examiner* — Jason H Duger
(74) *Attorney, Agent, or Firm* — Oblon, McClelland, Maier & Neustadt, L.L.P.

(57) ABSTRACT

A turbine engine, a turbojet, or a turboprop engine, including an annular combustion chamber defined by an inner shell and an outer shell, a turbine distributor arranged downstream of the combustion chamber, with a downstream end of the outer shell and/or of the inner shell of the chamber including a radial rim arranged opposite a radial rim of an upstream end of the distributor, a sealing mechanism including at least one strip extending between the rims to provide a seal between the combustion chamber and the distributor. The sealing strip extends axially and circumferentially between the rims and bears sealingly against free ends of the rims.

7 Claims, 5 Drawing Sheets

(52) U.S. Cl.
CPC ...... *F05D 2240/57* (2013.01); *F05D 2250/37* (2013.01); *Y02T 50/671* (2013.01); *Y02T 50/675* (2013.01)

(58) Field of Classification Search
CPC .... F23R 3/002; F23R 2900/0001; F02C 7/28; F05D 2250/37; F05D 2240/57; Y02T 50/671; Y02T 50/675; Y02T 50/6752
See application file for complete search history.

(56) References Cited

U.S. PATENT DOCUMENTS

| | | | | |
|---|---|---|---|---|
| 5,333,443 | A * | 8/1994 | Halila | F23R 3/002 60/752 |
| 5,417,545 | A | 5/1995 | Harrogate | |
| 5,701,733 | A * | 12/1997 | Lewis | F01D 9/023 415/209.2 |
| 6,030,005 | A | 2/2000 | Andersson et al. | |
| 6,199,871 | B1 * | 3/2001 | Lampes | F01D 11/005 277/614 |
| 6,988,369 | B2 | 1/2006 | Conete et al. | |
| 8,257,028 | B2 * | 9/2012 | Morgan | F01D 11/005 415/135 |
| 8,534,076 | B2 * | 9/2013 | Woodcock | F01D 9/023 415/138 |
| 8,695,989 | B2 * | 4/2014 | Dahlke | F23M 5/02 277/644 |
| 8,701,415 | B2 * | 4/2014 | Flanagan | F01D 11/005 277/312 |
| 2002/0184888 | A1 * | 12/2002 | Calvez | F23R 3/60 60/796 |
| 2004/0032089 | A1 * | 2/2004 | Conete | F23R 3/007 277/369 |
| 2004/0036230 | A1 * | 2/2004 | Matsuda | F01D 9/023 277/632 |
| 2005/0061005 | A1 * | 3/2005 | Lepretre | F01D 11/005 60/800 |
| 2006/0123797 | A1 * | 6/2006 | Zborovsky | F01D 9/041 60/800 |
| 2007/0134088 | A1 * | 6/2007 | Lee | F01D 9/00 415/209.2 |
| 2007/0134090 | A1 * | 6/2007 | Heyward | F01D 9/023 415/209.2 |
| 2008/0008584 | A1 * | 1/2008 | Shteyman | F01D 25/246 415/209.2 |
| 2008/0053107 | A1 * | 3/2008 | Weaver | F01D 9/023 60/800 |
| 2009/0077977 | A1 * | 3/2009 | Cayre | F23R 3/06 60/757 |
| 2011/0020118 | A1 * | 1/2011 | Smoke | F01D 9/02 415/191 |
| 2012/0073304 | A1 * | 3/2012 | Butkiewicz | F01D 9/023 60/772 |
| 2013/0042631 | A1 * | 2/2013 | Jadhav | F01D 9/023 60/800 |

FOREIGN PATENT DOCUMENTS

| | | |
|---|---|---|
| FR | 2 840 974 | 12/2003 |
| FR | 2 921 463 | 3/2009 |
| FR | 2 937 098 | 4/2016 |
| RU | 701 204 A1 | 10/1996 |
| SU | 1200609 A1 | 10/1990 |
| WO | WO 2006/119913 | 11/2006 |

\* cited by examiner

TURBINE ENGINE, SUCH AS A TURBOJET OR A TURBOPROP ENGINE

This invention relates to a turbine engine, such as a turbojet or a turboprop engine.

As is already known in particular in documents FR 2 840 974, FR 2 937 098 and FR 2 921 463 in the name of the Applicant, the annular combustion chamber of a turbine engine conventionally comprises coaxial walls of revolution that extend one inside the other, referred to as inner shell and outer shell, and which are connected at the upstream ends by a chamber bottom annular wall comprising opening for mounting fuel injectors.

During operation, a portion of the airflow supplied by a gas producer of the chamber passes through openings of the chamber bottom wall and is mixed with the fuel supplied by the injectors, with this air/fuel mixture then being burnt inside the chamber. Another portion of this airflow by-passes the combustion chamber then penetrates into the chamber through multiperforations of the inner and outer shells of the chamber.

A sectorised turbine inlet distributor is mounted at the outlet of the combustion chamber and comprises coaxial shells between which extend substantially radial blades. The shells of the distributor are in the axial extension of the inner and outer shells of the combustion chamber.

Sealing means are provided between the combustion chamber and the distributor, in particular between the downstream ends of the inner and outer shells of the combustion chamber and the upstream ends of the inner and outer shells of the turbine distributor.

More precisely, the downstream end of each shell of the combustion chamber comprises a rim of which a radial portion is extended by a cylindrical portion extending downstream. In addition, the upstream end of each shell of the distributor comprises a radial rim of a smaller dimension than the aforementioned radial portion of the corresponding rim of the combustion chamber.

The sealing means comprise sealing strips extending radially and circumferentially along each sector, each bearing sealingly against a radial face of the corresponding rim of the distributor and on the free end of the axial portion of the corresponding rim of the combustion chamber. The strips are maintained bearing against the rims using means of elastic return.

Such sealing means have the disadvantages mentioned hereinafter.

First of all, the rims of the shells of the combustion chamber are located in the by-pass airflow, in such a way that these portions of the combustion chamber have relatively substantial exchange surfaces with the cold airflow. These surfaces are therefore relatively cold in relation to the rest of the combustion chamber. The temperature differences within the shells of the combustion chamber can generate bending stresses, which negatively affect its lifespan.

Furthermore, such a structure requires providing on the shells of the combustion chamber, rims that have relatively substantial dimensions, which increases the overall mass.

The axial displacements between the combustion chamber and the turbine distributor can damage the strips and/or generate leaks. Generally, such radial strips do not have a good seal, which negatively affects the overall performance of the turbine engine (fuel consumption, pollution, relighting range, etc.) and exposes the downstream end of the combustion chamber to azimuth or circumferential thermal gradients.

Furthermore, in prior art, when the combustion chamber is fastened upstream by a pin system or an upstream retaining for example, it is necessary to provide bearing members on the downstream ends of the inner and outer shells of the combustion chamber. Each bearing member is generally annular and has a section in the shape of a U or a pin. Each bearing member extends radially inwards or outwards, between the corresponding rim of the inner shell or of the outer shell of the combustion chamber and an inner casing or an outer casing of the chamber. The bearing members limit the relative displacements between the rims of the combustion chamber and the rims of the distributor, and therefore also damage to the strips.

These bearing members are required in order to provide for the seal of the strips but have a substantial mass. Furthermore, cracks or fissures caused by thermal and/or mechanical stress can appear in the bearing members. Finally, functional clearances must be defined with precision between the bearing members and the inner and outer casings on which they bear against.

The invention has in particular for purpose to provide a simple, effective and economical solution to these problems.

To this effect, it proposes a turbine engine, such as a turbojet or a turboprop engine, comprising an annular combustion chamber defined by an inner shell and an outer shell, a turbine distributor arranged downstream of the combustion chamber, with the downstream end of the outer shell and/or of the inner shell of the chamber comprising a radial rim arranged opposite a radial rim of the upstream end of the distributor, sealing means comprising at least one strip extending between said rims in such a way as to provide the seal between the combustion chamber and the distributor, characterised in that the sealing strip extends axially and circumferentially between said rims and bears sealingly radially against the free ends of said rims.

In this way, the radial dimension of the rim of the combustion chamber can be reduced, which has for effect to reduce the overall mass and to reduce the exchange surfaces with the by-pass air. The temperature of the downstream end of the corresponding shell of the combustion chamber is as such increased, in such a way that the temperature differences within this shell and the bending stresses that stem from it are substantially reduced.

In addition, as the sealing strip is oriented axially, at least in its bearing zones on the aforementioned rims, it always provides a good seal, even in the case of substantial axial displacement of the combustion chamber in relation to the turbine distributor. This makes it possible to obtain a high output of the turbine engine and to be able to be free of the presence of bearing members. The mass of the combustion chamber can therefore be substantially reduced.

Advantageously, the free end of the rim of the combustion chamber is axially opposite the free end of the rim of the distributor.

Preferably, the turbine engine comprises means of elastic return that tend to stress the sealing strip bearing against the free ends of the rims.

According to a characteristic of the invention, the distributor comprises at least one positioning lug of which one end engages in a notch of a shape complementary with the strip, in such a way as to immobilise the strip in its circumferential direction and in its axial direction.

Furthermore, the turbine engine can comprise a cover extending circumferentially and axially, in such a way as to cover, at least partially, the rims of the chamber and of the distributor as well as the sealing strip.

The cover makes it possible to further reduce the thermal exchanges between the downstream end of the corresponding shell of the combustion chamber and the by-pass air.

In this case, the cover can be fastened using a screw or a rivet that forms the positioning lug of which the free end engages in the corresponding notch of the sealing strip.

The cover can have a generally U-shaped section comprising a base extending axially and two flanks extending radially inwards from the base, respectively a first flank extending radially upstream of the rim of the combustion chamber and a second flank extending radially downstream of the rim of the distributor.

According to a possibility of the invention, the second flank is fastened to a flange of the distributor, with the first flank being separated from the rim of the downstream end of the combustion chamber by a determined clearance, for example less than 3 mm.

Such a clearance makes it possible to offset any dilatation effect and as well as prevents the cover from being deformed by the bearing of the rim of the combustion chamber on the first flank.

According to another characteristic of the invention, the means of elastic return comprise at least one radially acting elastic member bearing on the one hand against the cover and on the other hand against the sealing strip.

In addition, the turbine distributor can be sectorised, with a strip and/or a cover extending circumferentially along each turbine sector.

Furthermore, the free ends of the rims can comprise grooves, with the strip having hollow zones that hug the shapes of the free ends of the rims.

The invention shall be better understood and other details, characteristics and advantages of the invention shall appear when reading the following description provided as a non-restricted example in reference to the annexed drawings wherein:

Figure 1:
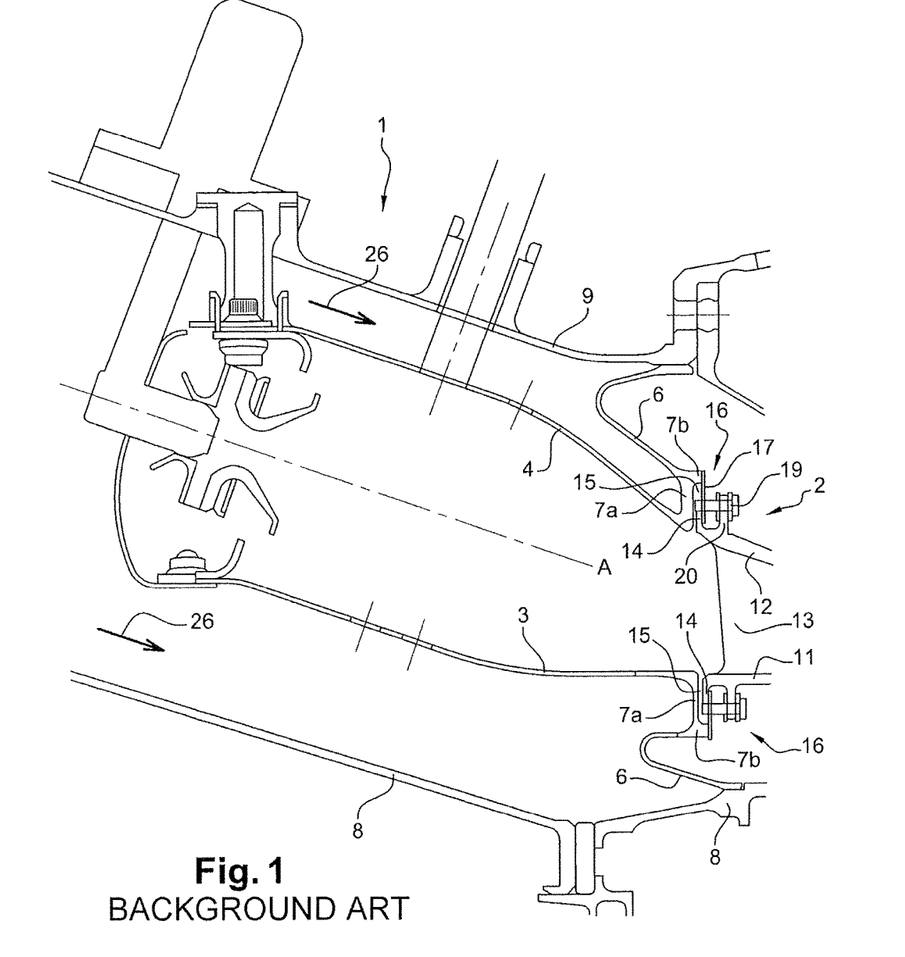
FIG. 1 is a longitudinal cross-section half-view of a portion of a combustion chamber and of a turbine distributor of a turbine engine of prior art.

Reference is first made to FIG. 1 which shows a portion of an annular combustion chamber 1 of a turbine engine of prior art, such as a turbojet or a turboprop engine, which is arranged downstream of a compressor and of a diffuser (not shown), and upstream of an inlet distributor 2 of a high-pressure turbine.

The combustion chamber 1 comprises inner and outer walls of revolution, referred to respectively as inner shell 3 and outer shell 4, which extend inside one another and which are connected upstream to a chamber bottom annular wall (not shown).

In order to limit the deformation of the inner 3 and outer 4 shells, the latter are provided at their downstream end with inner and outer bearing members 6. Each bearing member 6 is annular and has a section in the shape of a U or in the shape of a hairpin. Each bearing member 6 extends radially inwards or outwards, between a rim 7 of the inner shell 3 or of the outer shell 4 of the combustion chamber 1 and an inner casing 8 or an outer casing 9 of the chamber 1.

More particularly, the downstream end of each shell 3, 4 of the combustion chamber 1 comprises a rim 7 comprising a radial portion 7a extended by a cylindrical portion 7b extending downstream.

The distributor 2 is fastened downstream of the chamber 1 by suitable means and comprises annular inner 11 and outer 12 shells that extend inside one another and which are connected together by substantially radial blades 13. The outer shell 12 of the distributor 2 is axially aligned with the downstream end portion of the outer shell 4 of the chamber 1, and its inner shell 11 is axially aligned with the downstream end portion of the inner shell 3 of the chamber 1. The upstream end of each shell 11, 12 of the distributor 2 comprises a radial rim 14 of a dimension that is more reduced than the radial portion 7a of the corresponding rim 7 of the combustion chamber 1.

This distributor 2 is sectorised and forms several contiguous sectors on a circumference centred on the axis of revolution A of the chamber 1. The distributor sectors are for example in the number of fourteen.

The inner rims 7, 14 of the inner shells 3, 11 of the chamber 1 and of the distributor 2 delimit an inner annular space 15 that opens at one end in the chamber 1 and which is closed at its other end by sealing means 16.

Likewise, the outer rims 7, 14 of the outer shells 4, 12 of the chamber 1 and of the distributor 2 delimit an external annular space 15 that opens at one end in the chamber 1 and which is closed at its other end by sealing means 16.

The sealing means 16 located on annular spaces 15 shall be described in what follows.

Figure 2:
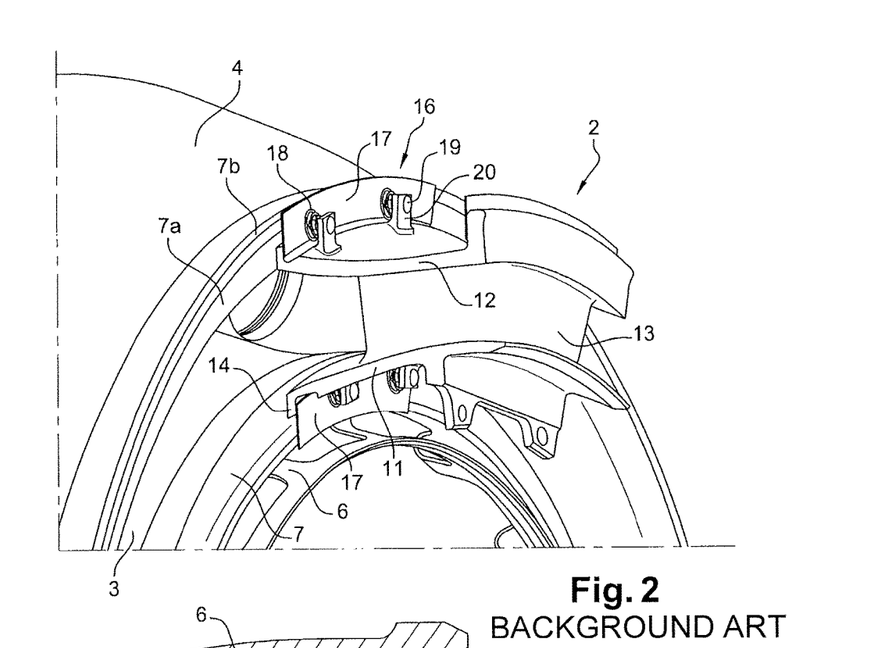
FIG. 2 is a perspective view of a portion of the chamber and of the distributor of FIG. 1, provided with sealing means.
Figure 3:
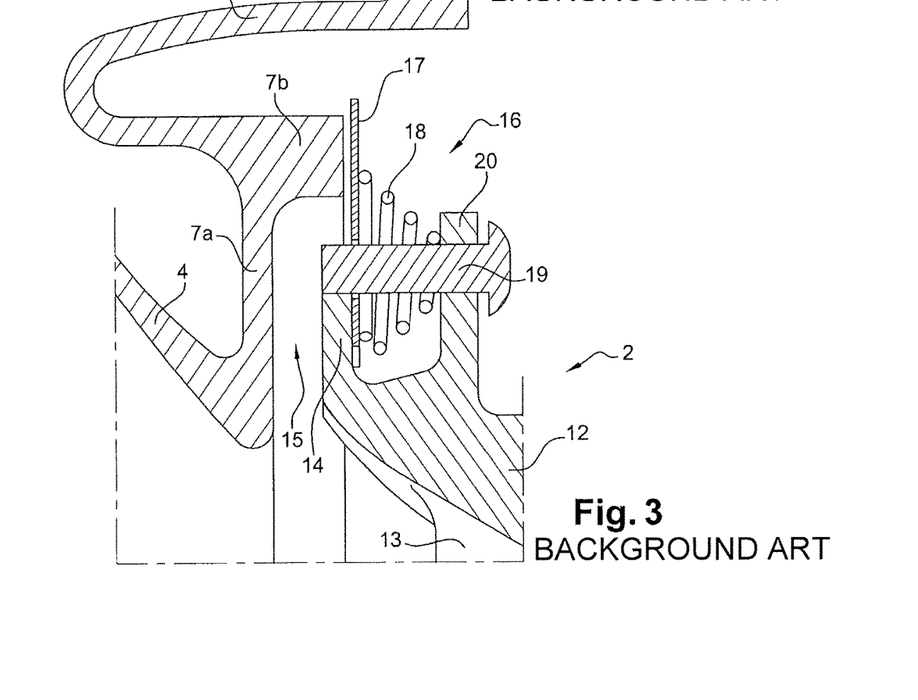
FIG. 3 is a detailed and cross-section view, showing the sealing means of prior art located between the outer shell of the combustion chamber and the outer shell of the distributor.
Figure 4:
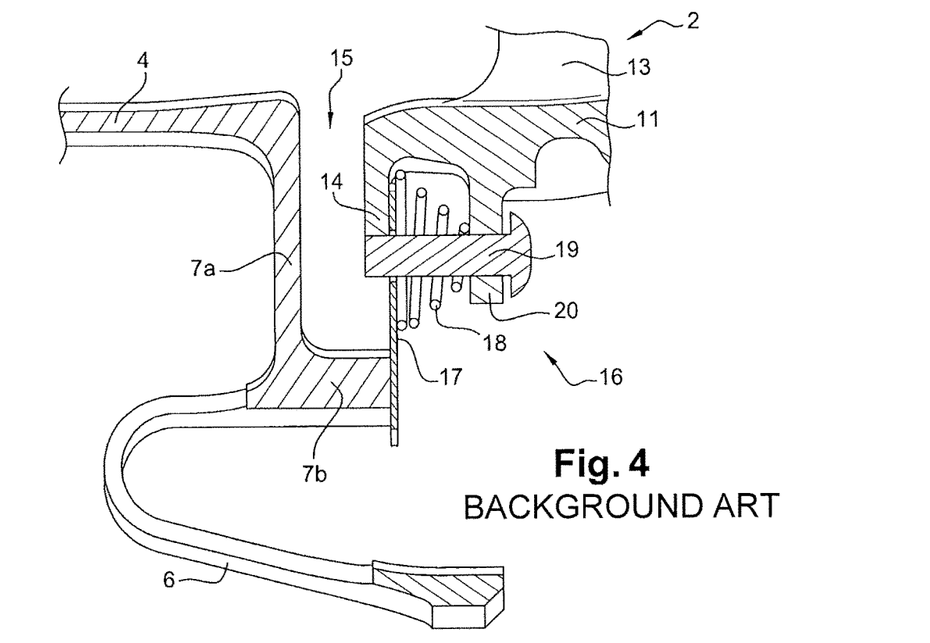
FIG. 4 is a detailed and cross-section view, showing the sealing means of prior art located between the inner shell of the combustion chamber and the inner shell of the distributor.

As can be seen better in FIGS. 2 to 4, these sealing means 16 comprise sealing strips 17 extending radially and circumferentially along each distributor sector 2. Each strip 17 bears sealingly against a radial face of the corresponding rim 14 of the distributor 2 and on the free end of the axial portion 7b of the corresponding rim 7 of the combustion chamber 1. The strips 17 are maintained against the rims 7, 14 using means of elastic return.

These elastic means are helical springs 18 of tapered shape, mounted around screws 19 which are screwed into the brackets 20 or flanges extending radially from the corresponding shell 11, 12 of the distributor 2. The shrunk portion of each spring 18 bears against a radial face of the corresponding bracket 20, with the widened portion bearing against the sealing strip 17. The ends of the screws 19 are engaged into the holes of the sealing strip 17, in such a way as to provide for its maintaining in position.

As indicated hereinabove, the use of such sealing means 19 increases the overall mass, reduces the lifespan of the combustion chamber 1 and penalises the overall performance of the turbine engine.

Furthermore, the bearing members 6 have a substantial mass and can be the location for the appearance of cracks or fissures caused by thermal and/or mechanical stresses. Finally, functional clearances must be defined with precision between the bearing members 6 and the inner and outer casings 8, 9 against which they bear.

FIGS. 5 to 9 show a portion of a turbine engine according to the invention. In these figures, the bearing members 6 are not necessarily shown, in order to facilitate the comprehension of the drawings.

Figure 8:
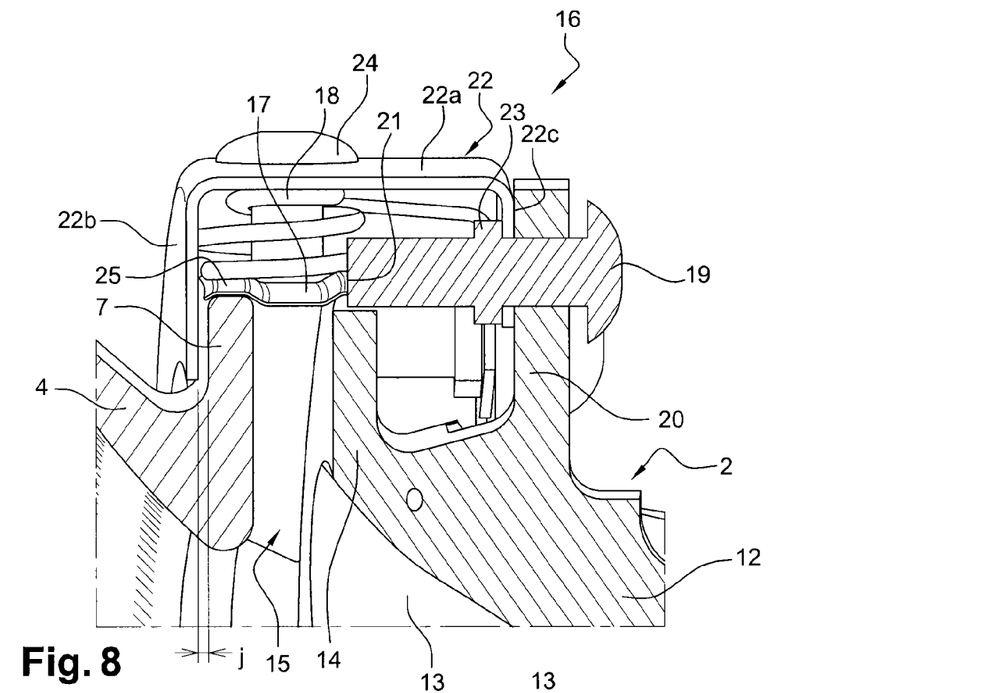
FIG. 8 is a detailed and cross-section view, of a portion of the outer shells of the chamber and of the distributor of FIG. 4, provided with associated sealing means.
Figure 9:
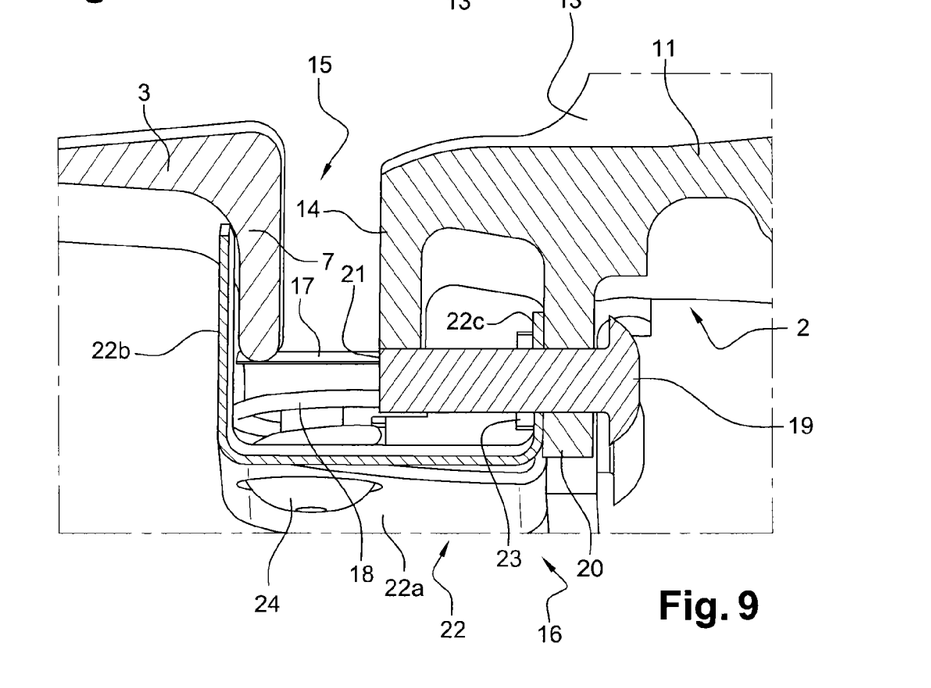
FIG. 9 is a detailed and cross-section view, of a portion of the inner shells of the chamber and of the distributor of FIG. 4, provided with associated sealing means.

As can be seen better in FIGS. 8 and 9 in the invention, the rims 7 of the inner 3 and outer 4 shells of the combustion chamber 1 extend radially and are devoid of axial portion. The free end of each rim 7 is located radially opposite the free end of the corresponding radial rim 14 of the distributor 2. A sealing strip 17 extends axially and circumferentially, on each distributor sector 2, between said radial rims 7, 14 and bears sealingly against the faces of the free ends of said rims 7, 14.

The sealing strip 17 comprises notches 21 that open onto its downstream edge, wherein are engaged the ends of the screws 19 fastened onto the brackets 20 of the distributor 2, in such a way as to immobilise the strip 17.

These screws 19 are also used to fasten a cover 22 extending circumferentially and axially, in such a way as to cover, at least partially, the corresponding rims 7, 14 of the chamber 1 and of the distributor 2 as well as the sealing strip 17.

The cover 22 has a generally U-shaped section comprising a base 22a extending axially and two flanks 22b, 22c extending radially inwards from the base 22a, respectively a first flank 22b extending radially upstream of the rim 7 of the combustion chamber 1 and a second flank 22c extending radially downstream of the rim 14 of the distributor 1.

The second flank 22c is fastened to the brackets 20 of the distributor 2 using screws 19 and nuts 23. The first flank 22b is separated from the rim of the downstream end of the combustion chamber 1 by a determined clearance j (FIG. 8), for example less than 3 mm. Such a clearance makes it possible to offset any dilatation effects and as well as prevent the cover 22 from being deformed by the bearing of the rim 7 of the combustion chamber 1 on the first flank 22b.

Means of elastic return that stresses the sealing strip 17 to bear against the free ends of the rims 7, 14. These means of return comprise helical compression springs 18 of which one end is bearing against the strip 17 and of which the other end is bearing against the base 22a of the cover 22. The springs 18 are mounted around screws or lugs 24 fastened in the base 22a of the cover 22.

The free ends of the rims 7 and/or 14 comprise grooves. The strip 17 can extend only axially (embodiment of FIG. 9) or comprises hollow zones 25 that hug the shapes of the free ends of the rims 7, 14 having grooves (embodiment of FIG. 8).

The presence of the grooves makes it possible to prevent any deterioration of the strips 17.

Note that, in the embodiment of FIG. 9, the strips 17 allow for a grand axial displacement of the combustion chamber 1 in relation to the distributor 2, without penalising the performance of the sealing means 16. The presence of hollow zones 25 makes it possible to better support a radial offset between the rims 7, 14 and therefore a slight pivoting of the strip 17 around the ends that have the grooves.

Note that, in the invention, the radial dimensions of the rims 7 of the combustion chamber 1 are reduced and that the bearing members 6 are not necessarily reduced, which has for effect to reduce the overall mass and to reduce the exchange surfaces with the by-pass air 26 (FIG. 1). The temperature of the downstream end of the corresponding shell 3, 4 of the combustion chamber 1 is as such increased, in such a way that the temperature differences within this shell 3, 4 and the bending stresses that stem from it are substantially reduced.

In addition, as the sealing strip 17 is oriented axially, at least in its bearing zones on the aforementioned rims 7, 14, it always provides a good seal, even in the case of axial displacement of the combustion chamber 1 in relation to the turbine distributor 2. The output of the turbine engine is as such increased.

Figure 5:
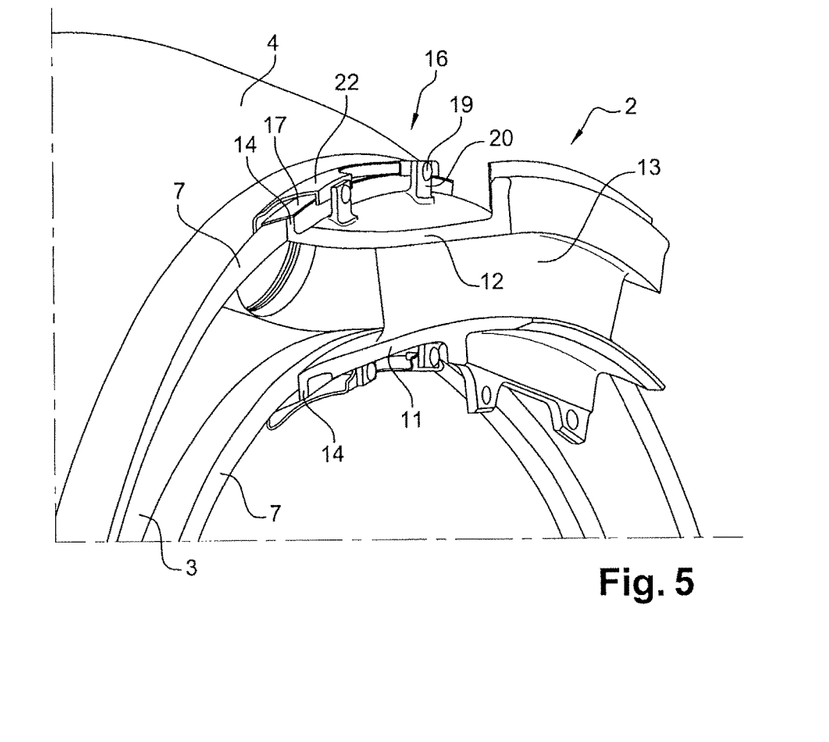
FIG. 5 is a view corresponding to FIG. 2, showing an embodiment of the invention.
Figure 6:
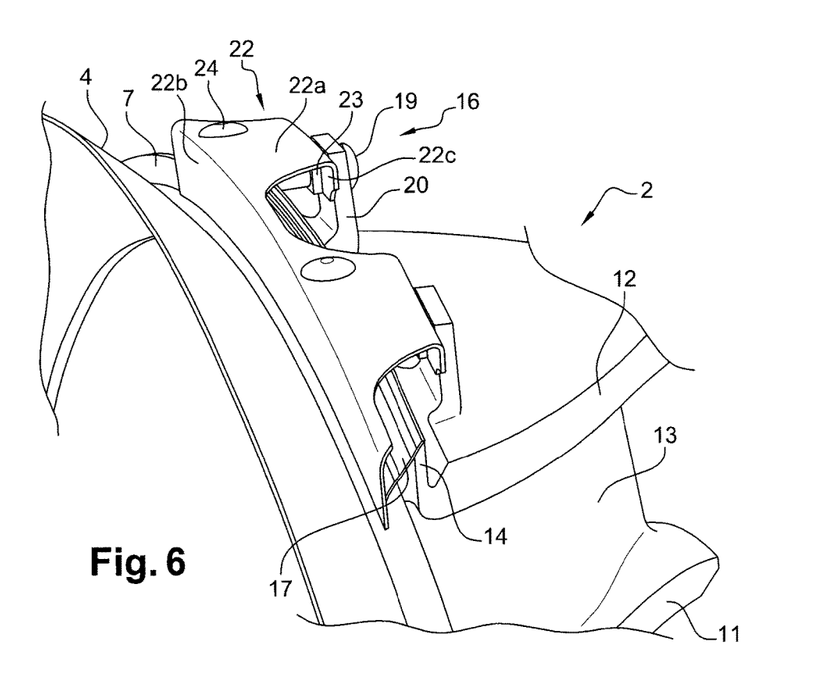
FIG. 6 is a perspective view of a portion of the outer shells of the chamber and of the distributor of FIG. 4, provided with associated sealing means.
Figure 7:
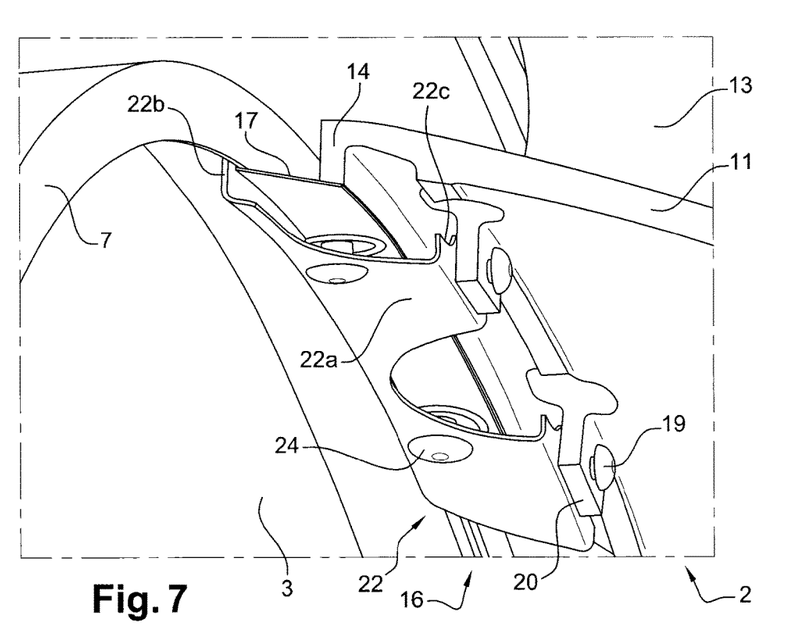
FIG. 7 is a perspective view of a portion of the inner shells of the chamber and of the distributor of FIG. 4, provided with associated sealing means.

The cover 22 makes it possible to further reduce the thermal exchanges between the downstream end of the corresponding shell 3, 4 of the combustion chamber 1 and the by-pass air 26. This cover 22 can be perforated on its base 22a and on its second flank 22c, as can be seen in FIGS. 5 to 7. On the contrary, the first flank 22b is more preferably continuous and devoid of an opening, in such a way as to limit the cooling of the downstream end of the corresponding shell 3, 4 of the combustion chamber 1 by the by-pass airflow 26 directed from the upstream downstream and directly affecting the first flank 22b.

The invention claimed is:

1. A turbomachine comprising:
   an annular combustion chamber defined by an inner shell and an outer shell;
   a turbine distributor arranged downstream of the annular combustion chamber;
   a downstream end of the outer shell or of the inner shell of the annular combustion chamber comprising a first radial rim arranged opposite a second radial rim of an upstream end of the turbine distributor, the first radial rim being an integral part of the annular combustion chamber and the second radial rim being an integral part of the turbine distributor, each of the first radial rim and the second radial rim including a proximal end and a distal end, the first radial rim and the second radial rim extending in a radial direction from the proximal end to the distal end; and
   a sealing mechanism comprising a sealing strip extending between the first radial rim and the second radial rim to provide a seal between the annular combustion chamber and the turbine distributor;
   a positioning lug; and
   a cover extending circumferentially and axially, to cover at least partially the first radial rim of the annular combustion chamber and the second radial rim of the turbine distributor and the sealing strip,
   wherein the sealing strip extends axially and circumferentially between the first radial rim and the second radial rim and bears against the distal end of the first radial rim and the distal end of the second radial rim,
   wherein one end of the positioning lug engages a notch of the sealing strip to immobilize the sealing strip in a circumferential direction of the sealing strip and in an axial direction of the turbomachine, and
   wherein the cover is fastened using the positioning lug, the positioning lug defined as a screw or a rivet.

2. The turbomachine according to claim 1, wherein the distal end of the first radial rim of the annular combustion chamber is axially opposite the distal end of the second radial rim of the turbine distributor.

3. The turbomachine according to claim 1, further comprising a helical spring to stress the sealing strip bearing against the distal ends of the first radial rim and the second radial rim.

4. The turbomachine according to claim 1, wherein an elastic return mechanism comprises at least one radially acting elastic member bearing against the cover and against the sealing strip.

5. The turbomachine according to claim 1, wherein the turbine distributor is sectorized to form a plurality of distributor sectors, with the sealing strip and/or the cover extending circumferentially along each of the distributor sectors.

6. A turbomachine comprising:
- an annular combustion chamber defined by an inner shell and an outer shell;
- a turbine distributor arranged downstream of the annular combustion chamber;
- a downstream end of the outer shell or of the inner shell of the annular combustion chamber comprising a first radial rim arranged opposite a second radial rim of an upstream end of the turbine distributor, the first radial rim being an integral part of the annular combustion chamber and the second radial rim being an integral part of the turbine distributor, each of the first radial rim and the second radial rim including a proximal end and a distal end, the first radial rim and the second radial rim extending in a radial direction from the proximal end to the distal end; and
- a sealing mechanism comprising a sealing strip extending between the first radial rim and the second radial rim to provide a seal between the annular combustion chamber and the turbine distributor;
- a positioning lug; and
- a cover extending circumferentially and axially, to cover at least partially the first radial rim of the annular combustion chamber and the second radial rim of the turbine distributor and the sealing strip, wherein the sealing strip extends axially and circumferentially between the first radial rim and the second radial rim and bears against the distal end of the first radial rim and the distal end of the second radial rim, wherein one end of the positioning lug engages a notch of the sealing strip to immobilize the sealing strip in a circumferential direction of the sealing strip and in an axial direction of the turbomachine, and wherein the cover has a generally U-shaped section comprising a base extending axially and a first flank extending radially inwards from the base, and a second flank extending radially inwards from the base, respectively the first flank extending radially upstream of the first radial rim of the annular combustion chamber and the second flank extending radially downstream of the second radial rim of the turbine distributor.

7. The turbomachine according to claim 6, wherein the second flank is fastened to a flange of the turbine distributor, with the first flank being separated from the first radial rim of the downstream end of the annular combustion chamber by less than 3 mm and more than 0 mm.

* * * * *